United States Patent [19]
Randall

[11] Patent Number: 6,072,260
[45] Date of Patent: Jun. 6, 2000

[54] NOISE REDUCTION IN RELUCTANCE MACHINES

[75] Inventor: Steven Paul Randall, Leeds, United Kingdom

[73] Assignee: Switched Reluctance Drives Limited, Harrogate, United Kingdom

[21] Appl. No.: 09/232,981

[22] Filed: Jan. 19, 1999

[30] Foreign Application Priority Data

Jan. 20, 1998 [GB] United Kingdom .................. 9801187

[51] Int. Cl.[7] .............................. H02K 1/00; H02K 5/24; H02K 17/42; H02K 1/24
[52] U.S. Cl. ........................... 310/216; 310/51; 310/168; 310/269
[58] Field of Search ................................. 310/216, 217, 310/254, 258, 259, 261, 262, 51, 168, 49 R, 269, 192, 193, 172

[56] References Cited

U.S. PATENT DOCUMENTS

| | | | |
|---|---|---|---|
| 606,863 | 7/1898 | Gutmann | 310/168 |
| 2,630,561 | 3/1953 | Mueller | 310/261 |
| 4,186,316 | 1/1980 | Singh | 310/49 R |
| 4,647,802 | 3/1987 | Konecny | 310/49 R |
| 4,698,537 | 10/1987 | Byrne et al. | 310/168 |
| 5,146,127 | 9/1992 | Smith | 310/166 |
| 5,148,090 | 9/1992 | Oku et al. | 318/107 |
| 5,220,228 | 6/1993 | Sibata | 310/254 |
| 5,233,254 | 8/1993 | Fisher et al. | 310/261 |
| 5,319,297 | 6/1994 | Bahn | 318/701 |
| 5,418,415 | 5/1995 | Ishizaki | 310/162 |
| 5,559,386 | 9/1996 | Gurrieri | 310/211 |
| 5,619,113 | 4/1997 | Bahn | 318/701 |
| 5,668,430 | 9/1997 | Kolomeitsev | 310/266 |
| 5,844,346 | 12/1998 | Kolomeitsev | 310/254 |

FOREIGN PATENT DOCUMENTS

| | | |
|---|---|---|
| 0 528 750 A2 | 2/1993 | European Pat. Off. . |
| 0 573 198 A1 | 12/1993 | European Pat. Off. . |
| 0 763 883 A2 | 3/1997 | European Pat. Off. . |
| 0 795 949 A1 | 9/1997 | European Pat. Off. . |
| 30 08 937 A1 | 9/1981 | Germany . |
| 42 13 372 A1 | 10/1993 | Germany . |
| 2 246 481 | 3/1995 | United Kingdom . |
| WO 97/39512 | 10/1997 | WIPO . |

OTHER PUBLICATIONS

A. L. Jokl, Theory and Design of Synchronous Mchines, Spring 1993, p. 2.

"Variable–Speed Switched Reluctance Motors", by P.J. Lawrenson et al., IEE Proc., vol. 127, Pt. B., No. 4, Jul. 1980, pp. 253–266.

"Influence of Stator Geometry Upon Vibratory Behaviour and Electromagnetic Performance of Switched Reluctance Motors", by C. Picod et al, 8th International Conference on Electrical Machines and Drives, EMD97 Sep. 1–3, 1997, Conference Publication No. 444, pp. 69–73.

"Analysis and Reduction of Vibration and Acoustic Noise in Switched Reluctance Drives", by C.Y. Wu et al., IEEE Conference, Oct. 2–8, 1993, pp. 106–113.

(List continued on next page.)

*Primary Examiner*—Elvin Enad
*Assistant Examiner*—Dang Dinh Le
*Attorney, Agent, or Firm*—Patterson & Keough, P.A.

[57] ABSTRACT

In a switched reluctance machine, the air gap between aligned rotor and stator poles is defined to have an inner region of substantially uniform length and outer regions of increasing length. The outer regions are flanked by extension portions on one or both of the poles that form a radiussed transition region on the pole between each outer region and a side wall of the pole. The at least one of the poles has a waist portion between the extension portions and the body of the lamination. As the rotor rotates with respect to the stator, alignment of the poles more gradually modifies the flux path such that radial forces tending to distort the stator and give rise to vibration and acoustic noise are reduced. The waist portion decreases the inductance of the stator winding in the minimum inductance position of the rotor.

40 Claims, 10 Drawing Sheets

OTHER PUBLICATIONS

"Impact of Pole Tapering on the Electromagnetic Torque of the Switched Reluctance Motor", by C. Neagoe et al., IEEE International Electrical Machines Conference Record, May 1997, Milwaukee, Wisconsin Paper WA1–2.1–2.3.

"The Influence of the Rotor Pole Shape on the Static and Dynamic Characteristics of the Switched Reluctance Motor", by A. Pelikant et al., IEEE Transactions on Magnets, vol. 32, No. 3, May 1996, pp. 1529–1532.

"Pole Arcs Selection of Switched Reluctance Motor", by Wu Jianhua et al., Proceedings of International Conference on Electrical Machines in Adelaide, Australia, vol. 3, Dec. 1993, pp. 571–576.

"Effect of Rotor Profiles on the Torque of a Switched Reluctance Motor", by M. Moallem et al., Proceedings of IEEE, IAS Conference in Seattle, Washington, Oct. 1990, pp. 247–253.

"The Characteristics, Design and Applications of Switched Reluctance Motor and Drives", by Dr. J.M. Stephenson, et al., Seminar 5, PCIM '93 Conference & Exhibition in Nurnberg, Germany, Jun. 21–24, 1993, pp. 1–68.

"CEE 548 Theory & Design of Synchronous Machines", by A.L. Jokl, Department of Electrical Engineering, The Catholic University of America, Spring Semester 1993, pp. 1–2.

"Computer–Optimised Current Waveforms for Switched–Reluctance Motors", by H.C. Lovatt et al., IEE Proc. Electr. Power App., vol. 141, No. 2, Mar. 1994, pp. 45–51.

NOISE REDUCTION IN RELUCTANCE MACHINES

BACKGROUND OF THE INVENTION

1. Field of the Invention

The present invention relates to noise reduction in reluctance machines.

2. Description of Related Art

In general, a reluctance machine is an electrical machine in which torque is produced by the tendency of its movable part to move into a position where the reluctance of a magnetic circuit is minimized, i.e. where the inductance of the exciting winding is maximized. In one type of reluctance machine, the energization of the phase windings occurs at a controlled frequency. This type is generally referred to as a synchronous reluctance machine, and it may be operated as a motor or a generator. In a second type of reluctance machine, circuitry is provided for detecting the angular position of the rotor and energizing the phase windings as a function of the rotor position. This second type of reluctance machine is generally known as a switched reluctance machine and it may also be a motor or a generator. The characteristics of such switched reluctance machines are well known and are described in, for example, "The characteristics, design and application of switched reluctance motors and drives" by Stephenson and Blake, PCIM '93, Nürnberg, Jun. 21–24, 1993, which is incorporated herein by reference. The present invention is generally applicable to reluctance machines, including switched reluctance machines operating as motors or generators.

FIG. 1 shows the principal components of a typical switched reluctance drive system. The input DC power supply 11 can be either a battery or rectified and filtered AC mains. The DC voltage provided by the power supply 11, which can be fixed or variable in magnitude, is switched across the phase windings 16 of the motor 12 by a power converter 13 under the control of the electronic control unit 14. The switching must be correctly synchronized to the angle of rotation of the rotor for proper operation of the drive. A rotor position detector 15 is typically employed to supply signals corresponding to the angular position of the rotor. The output of the rotor position detector 15 may also be used to generate a speed feedback signal.

The rotor position detector 15 may take many forms; for example it may take the form of hardware, as shown schematically in FIG. 1, or of a software algorithm which calculates the position from other monitored parameters of the drive system, as described in EP-A-0573198 (Ray), which is incorporated herein by reference. In some systems, the rotor position detector 15 can comprise a rotor position transducer that provides output signals that change state each time the rotor rotates to a position where a different switching arrangement of the devices in the power converter 13 is required.

The energization of the phase windings in a switched reluctance machine depends heavily on accurate detection of the angular position of the rotor. The importance of accurate signals from the rotor position detector 15 may be explained by reference to FIGS. 2 and 3, which illustrate the switching of a reluctance machine operating as a motor.

FIG. 2 generally shows a rotor pole 20 approaching a stator pole 21 according to arrow 22. As illustrated in FIG. 2, a portion 23 of a complete phase winding 16 is wound around the stator pole 21. As discussed above, when the portion of the phase winding 16 around stator pole 21 is energized, a force will be exerted on the rotor, tending to pull rotor pole 20 into alignment with stator pole 21. The pole faces of both rotor and stator poles are defined by arcs having their centers on the rotational axis of the rotor. The angular extent of these arcs is a matter of choice by the designer. The traditional methods for choosing the angular extents of the arcs are discussed in "Variable-speed switched reluctance motors" by Lawrenson et al, IEE Proc., Vol. 127, Pt. B, No. 4, July 1980, pp. 253–265, which is incorporated herein by reference. It will be recognized by those skilled in the art that, as a consequence of the arcuate pole faces, the distance between the overlapping pole faces of the rotor and stator, when measured along a radius from the rotational axis, is constant.

FIG. 3 generally shows typical switching circuitry in the power converter 13 that controls the energization of the phase winding 16, including the portion 23 around stator pole 21. When switches 31 and 32 are closed, the phase winding is coupled to the source of DC power and is energized. Many other configurations of switching circuitry are known in the art; some of these are discussed in the Stephenson & Blake paper cited above.

In general, the phase winding is energized to effect the rotation of the rotor as follows. At a first angular position of the rotor (called the "turn-on angle", $\theta_{ON}$) the controller 14 provides switching signals to turn on both switching devices 31 and 32. When the switching devices 31 and 32 are on, the phase winding is coupled to the DC bus, causing an increasing magnetic flux to be established in the machine. The magnetic flux produces a magnetic field in the air gap which acts on the rotor poles to produce the motoring torque. The magnetic flux in the machine is supported by the magneto-motive force (mmf) which is provided by a current flowing from the DC supply through the switches 31 and 32 and the phase winding 23. In some controllers, current feedback is employed and the magnitude of the phase current is controlled by chopping the current by rapidly switching one or both of switching devices 31 and/or 32 on and off. FIG. 4($a$) shows a typical current waveform in the chopping mode of operation, where the current is chopped between two fixed levels. In motoring operation, the turn-on angle $\theta_{ON}$ is often chosen to be the rotor position where the center-line of an inter-polar space on the rotor is aligned with the centerline of a stator pole, but may be some other angle.

In many systems, the phase winding remains connected to the DC bus (or connected intermittently if chopping is employed) until the rotor rotates such that it reaches what is referred to as the "freewheeling angle", $\theta_{FW}$. When the rotor reaches an angular position corresponding to the freewheeling angle (e.g., the position shown in FIG. 2) one of the switches, for example 31, is turned off. Consequently, the current flowing through the phase winding will continue to flow, but will now flow through only one of the switches (in this example 32) and through only one of the diodes 33/34 (in this example 34). During the freewheeling period, the voltage drop across the phase winding is small, and the flux remains substantially constant. The circuit remains in this freewheeling condition until the rotor rotates to an angular position known as the "turn-off angle", $\theta_{OFF}$ (e.g. when the centerline of the rotor pole is aligned with that of the stator pole). When the rotor reaches the turn-off angle, both switches 31 and 32 are turned off and the current in phase winding 23 begins to flow through diodes 33 and 34. The diodes 33 and 34 then apply the DC voltage from the DC bus in the opposite sense, causing the magnetic flux in the machine (and therefore the phase current) to decrease.

As the speed of the machine rises, there is less time for the current to rise to the chopping level, and the drive is normally run in a "single-pulse" mode of operation. In this mode, the turn-on, freewheel and turn-off angles are chosen as a function of, for example, speed and load torque. Some systems do not use an angular period of freewheeling, i.e. switches 31 and 32 are switched on and off simultaneously. FIG. 4(b) shows a typical such single-pulse current waveform where the freewheel angle is zero.

It is well known that the values of turn-on, freewheel and turn-off angles can be predetermined and stored in some suitable format for retrieval by the control system as required, or can be calculated or deduced in real time.

When the phase winding of a switched reluctance machine is energized in the manner described above, the magnetic field set up by the flux in the magnetic circuit gives rise to the circumferential forces which, as described, act to pull the rotor poles into line with the stator poles. In addition, however, the field also gives rise to radial forces which are generally an order of magnitude greater than the circumferential forces, and which principally act to distort the stator structure radially, by pulling the stator radially towards the rotor. This is often termed "ovalizing". Such forces are described in detail, for example, in "Influence of stator geometry upon vibratory behavior and electromagnetic performances of switched reluctance motors", by Picod, Besbes, Camus, & Gabsi, IEE EMD97, Eighth International Conference On Electrical Machines and Drives, Sep. 1–3, 1997, Robinson College, Cambridge, UK, pp. 69–73, which is incorporated herein by reference. The effect of these ovalizing forces on the vibrational behavior of the stator structure is analyzed and discussed in EPA 0763883, which is incorporated herein by reference. It is well known in the art that these vibrational forces can give rise to acoustic noise being emitted from the structure of the machine or from other components to which the machine is attached.

Many methods of modifying these forces, and hence reducing the acoustic noise, have been suggested in the past. The methods have generally approached the problem by modifying, in some way, the excitation supplied to the phase winding. For example, "Analysis and reduction of vibration and acoustic noise in the switched reluctance drive", Wu & Pollock, IEEE IAS Conference, Toronto, Oct. 2–8 1993, pp. 106–113, which is incorporated herein by reference, discusses a proposal for using a predetermined amount of freewheeling to reduce noise.

SUMMARY OF THE INVENTION

It is an object of the present invention to address the problem of acoustic noise emission from switched reluctance machines.

According to an embodiment of the present invention there is provided a set of laminations for a reluctance machine, comprising: a rotor lamination and a stator lamination, each lamination having a body and an array of poles extending radially from its respective body therefrom about an axis, each pole being substantially symmetrical about a center line and having a pole face and side surfaces extending between the body and the pole face, the pole faces of the rotor poles and the pole faces of the stator poles cooperating to define respective air gaps therebetween when the laminations are arranged on a common axis and the center lines of the rotor poles and the center lines of the stator poles are coincident, each air gap having an inner region of substantially constant radial length and an outer region, on either side of the inner region, of progressively greater radial length extending away from the inner region, one or both of the said rotor poles and stator poles having an extension on the side of each outer region, the extension smoothly merging each outer region with a corresponding side surface, and at least one of the laminations having an undercut defining a waist in said one or both poles between each extension and the body, the dimensions of the pole faces being adapted to provide a smoothly changing flux path as the rotor pole moves into and out of alignment with the stator pole.

The extensions provide a relatively gradual lead in to and lead out from the region about minimum reluctance. Preferably, the extensions are beyond the main part of the opposing pole face in which the inner and outer regions of the air gap are defined.

The inner region may extend about four times the angular width of each outer region.

The waist in the pole piece increases the reluctance between the poles in a maximum reluctance position of a rotor pole with respect to the stator pole which is beneficial to the performance of a machine made using such a set of laminations.

Preferably, the rotor and/or stator pole face has an arcuate surface over the angular extent of both the inner region and the outer regions, the arc coinciding with the diameter centered on the said common axis.

Preferably, the chordal width of the waist of the stator or rotor pole is less than the greatest chordal width between the extensions.

Preferred embodiments of the invention are described in which the rotor poles are profiled on one or both of the pole faces defining the air gap and on their sides. This gives a particular benefit in noise reduction without any significant reduction of the circumferential forces which contribute to the output of the machine.

The invention also extends to a reluctance machine having a set of laminations as referred to above, and to a method of forming a rotor and stator for a reluctance machine.

BRIEF DESCRIPTION OF THE DRAWINGS

The invention can be put into practice in various ways, some of which will now be described by way of example with reference to the accompanying drawings, in which.

DETAILED DESCRIPTION OF PREFERRED EMBODIMENTS

Figure 1:
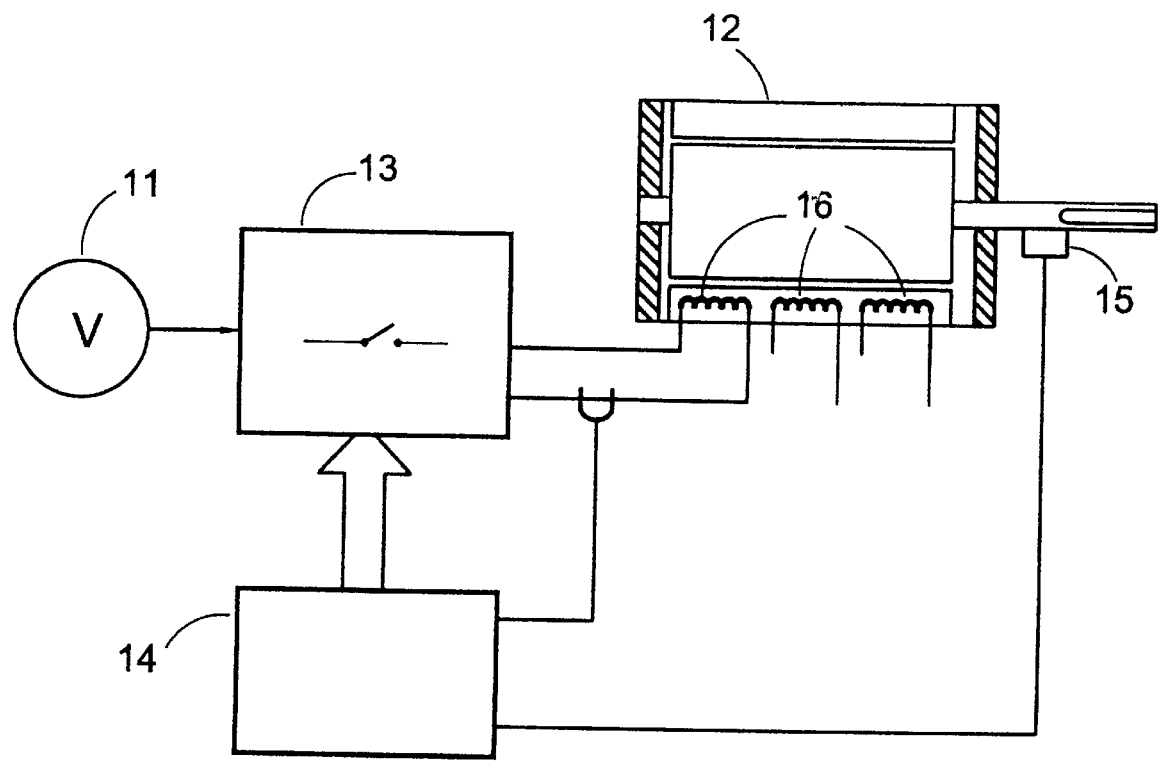
FIG. 1 shows the principal components of a switched reluctance drive system.
Figure 2:
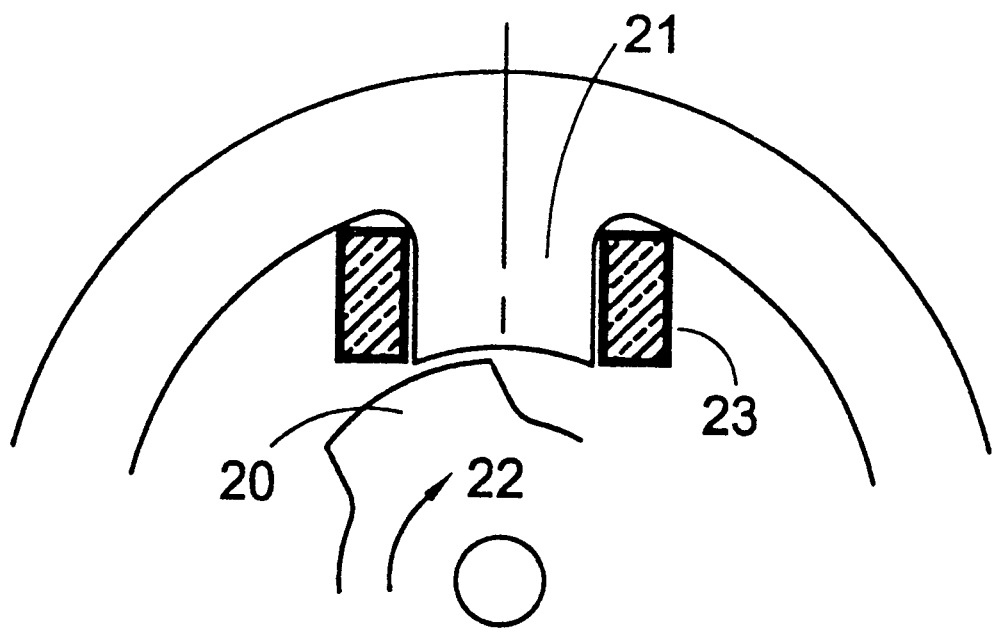
FIG. 2 shows a schematic diagram of a rotor pole approaching a stator pole.
Figure 3:
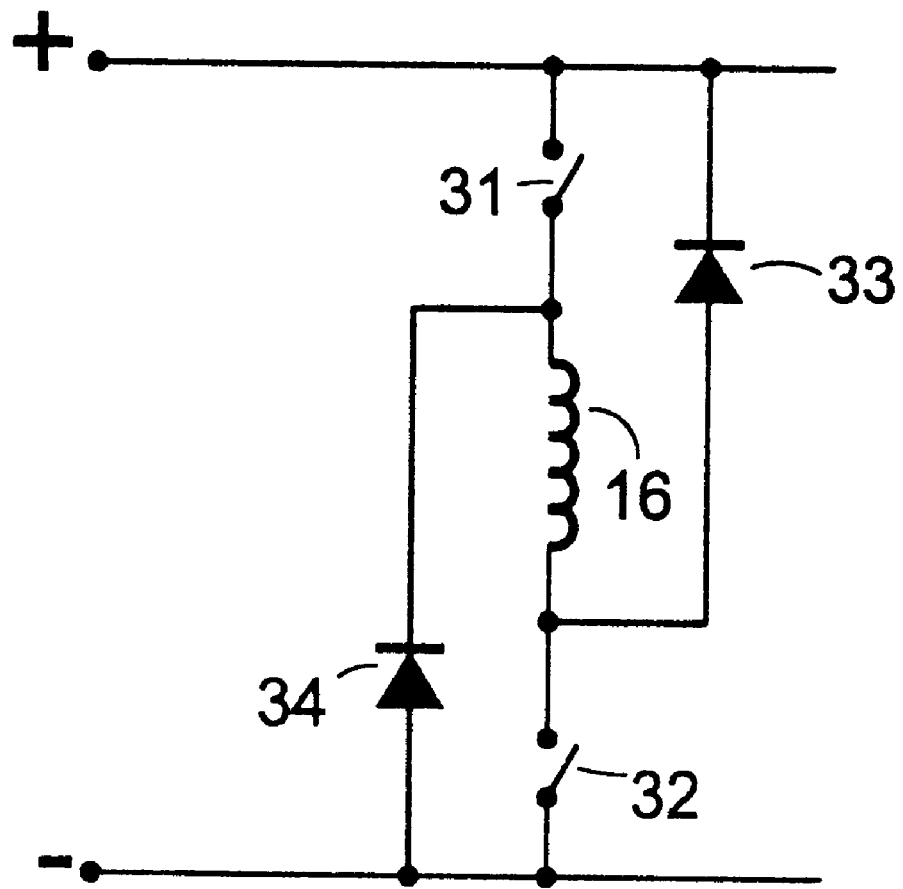
FIG. 3 shows typical switching circuitry in a power converter that controls the energization of the phase windings of the machine of FIG. 1.
Figure 4A:
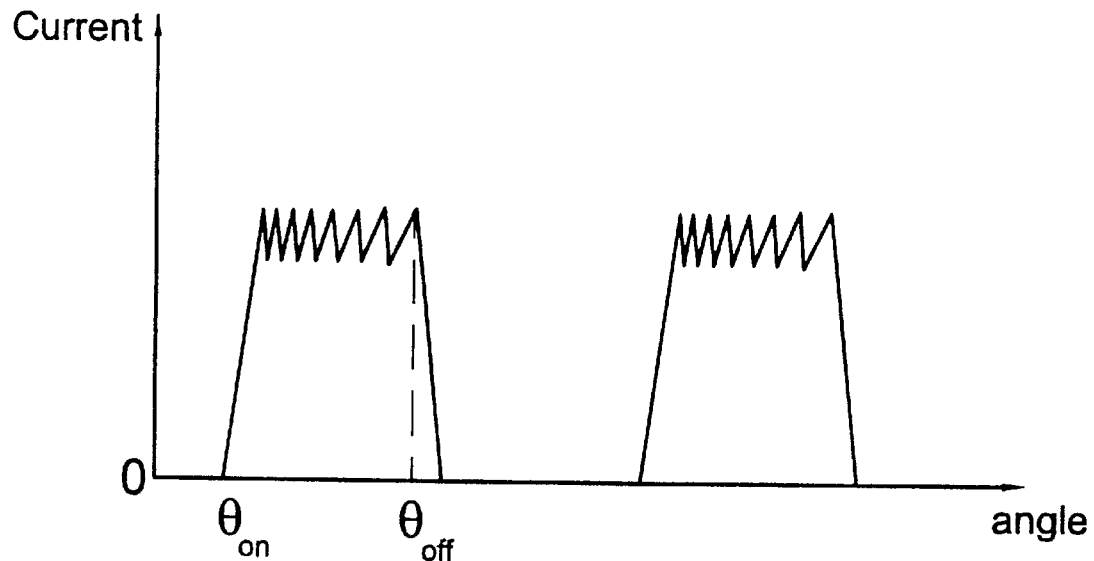
FIGS. 4(a) and 4(b) illustrate typical current waveforms of a switched reluctance drive operating in chopping and single-pulse modes respectively.
Figure 4B:
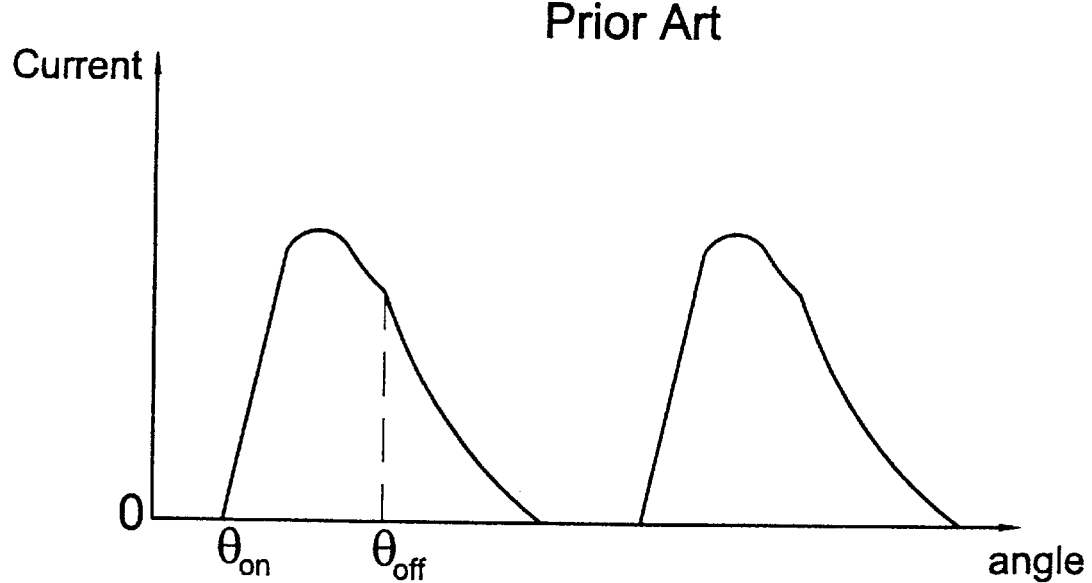
Figure 5A:
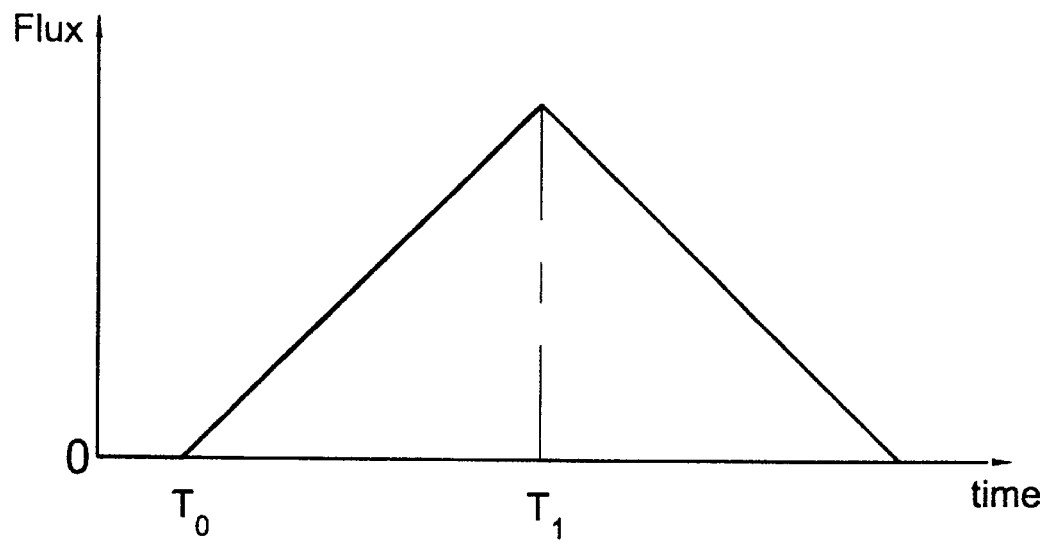
FIGS. 5(a) and 5(b) show the relationship between flux waveform and mechanical force in a stator.
Figure 5B:
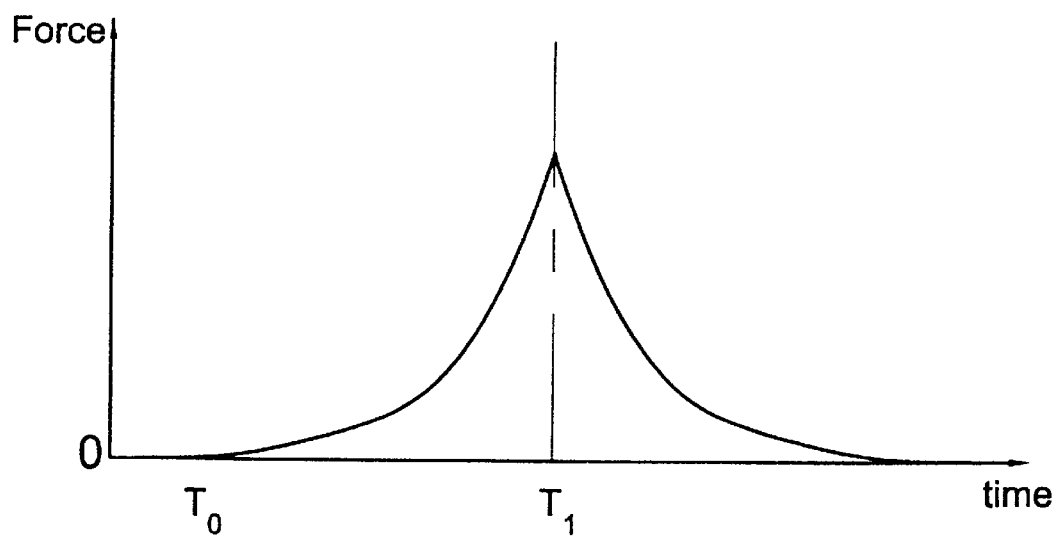

The excitation cycle of a phase of the switched reluctance system shown in FIG. 1, operating in the single pulse mode, has a current waveform as shown in FIG. 4(b). If the cycle begins with the voltage being applied to the phase winding at a time $T_0$ by closing the switches, as shown in FIG. 3, the flux produced by the winding will increase substantially linearly with time, as shown in FIG. 5(a). This increasing flux, flowing principally through the faces of the stator and rotor poles as the rotor moves into alignment with the stator, produces a magnetic field which exerts an increasing force on the stator structure which will tend to ovalize the stator. If the force is taken to be proportional to the square of the flux, it will have the general form shown in FIG. 5(b). Depending on the stiffness and inertia of the stator structure, there will be a certain amount of deflection caused by this force. At the end of the required conduction time for the phase winding, i.e. at $T_1$, the switches are opened and the flux begins to decay substantially linearly. Thus at point $T_1$ there is a significant change in the gradient of the force curve which, as described in more detail in EP-A-0763883 cited above, gives rise to an oscillatory mechanical response in the stator structure and generally leads to acoustic "ringing" of the structure.

Figure 6:
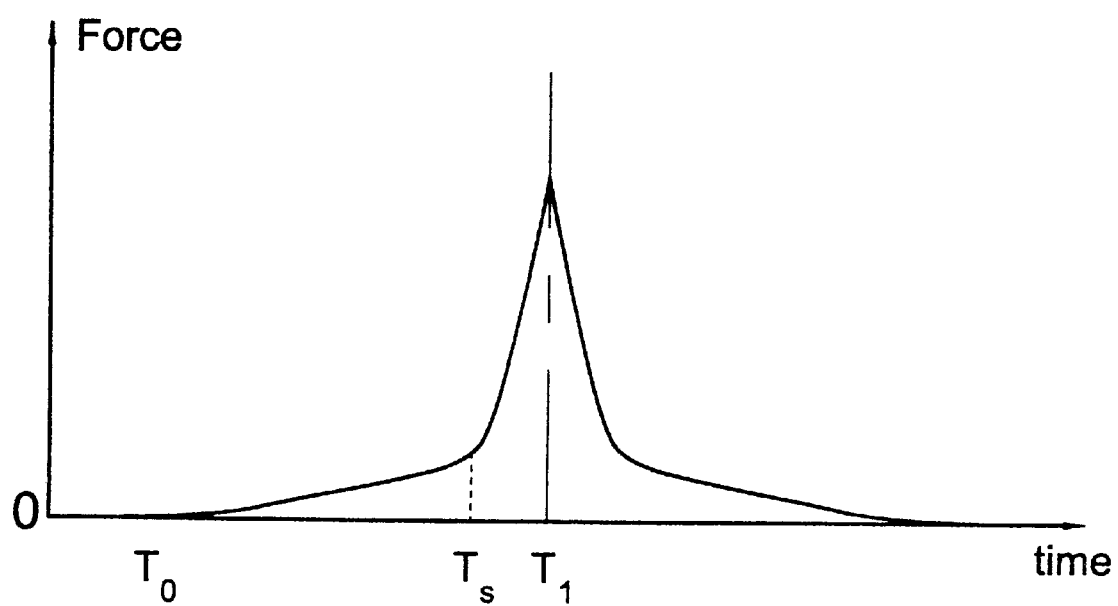
FIG. 6 shows the relationship between flux waveform and mechanical force in a stator, taking into account the non-linearity of flux paths.

The above explanation and calculations are based on the premise that the force can be calculated by simple algebraic methods. In practice, this is an approximation, since the magnetic characteristics of the lamination material are non-linear and the flux paths, particularly in the air surrounding the poles, are extremely complex. The problem can be solved by the use of, for example, finite element analysis, and these more sophisticated approaches lead to much better estimates for the variation of force with angle, as shown for example in FIG. 6. This confirms that there are large changes in gradient in the force waveform, though at points rather different to those which would be expected by the simple analysis, e.g. at the point $T_S$ where overlap of the pole faces begins.

Figure 7:
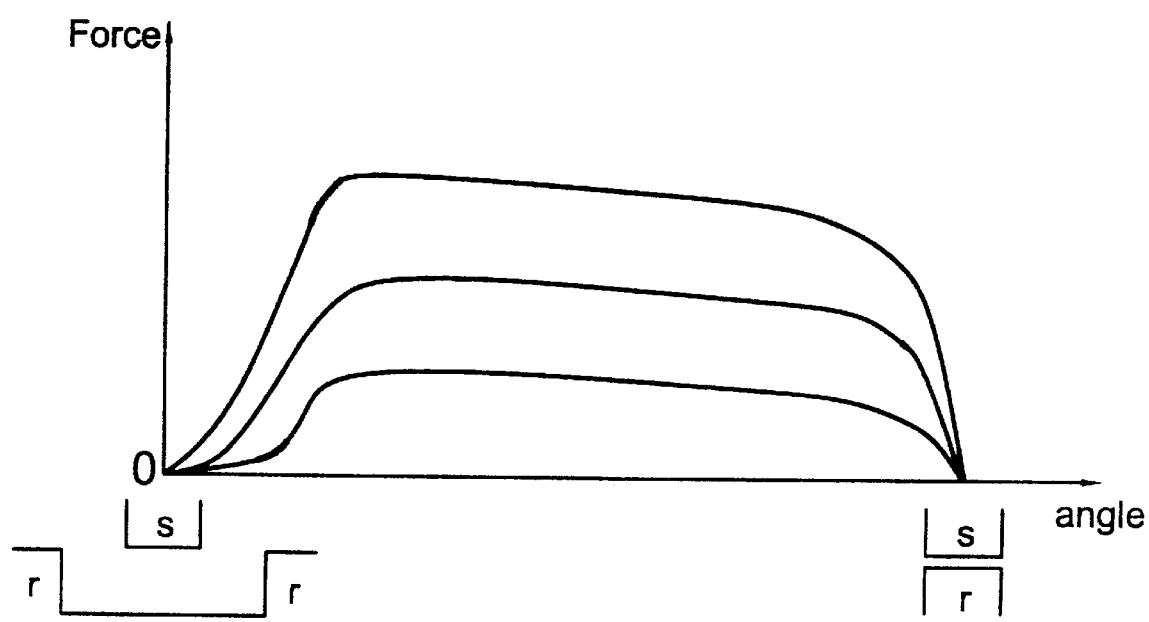
FIG. 7 shows typical curves of circumferential force against rotor angle for three values of phase winding current.

The above discussion has considered the radial (or "normal") component of force. The useful component, i.e. that in the circumferential direction, likewise varies with time and angle. FIG. 7 shows some typical curves which are drawn to the conventional base of angle with current as the parameter. The curves originate at the point where the stator pole s is intermediate rotor poles r and end at the point of full alignment. Again, it will be seen that there are large changes in gradient over the cycle, particularly where the rotor and stator pole faces are just beginning to overlap.

Figure 8A:
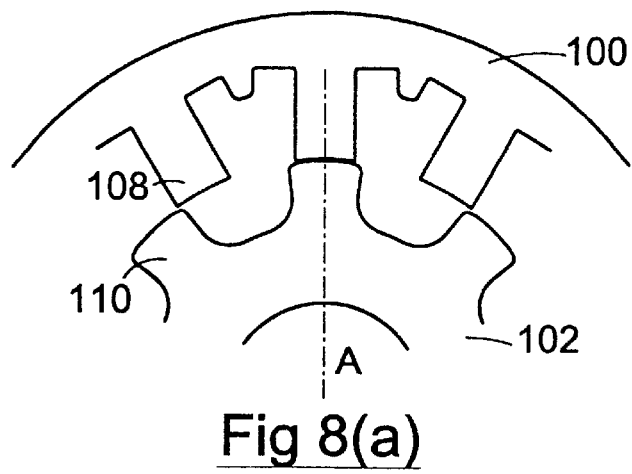
FIGS. 8(a)–8(c) show an exemplary lamination profile according to an embodiment of the invention.
Figure 8B:
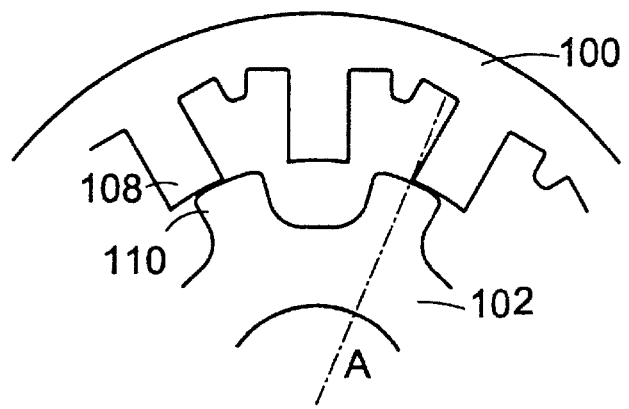

FIGS. 8(a) and 8(b) show sections of a stator lamination 100 and a rotor lamination 102 for a switched reluctance machine with 12 stator poles 108 and 8 rotor poles 110 using proportions according to embodiments of the invention. As in a conventional machine, the rotor and the stator are each made up of a stack of such laminations and incorporated in the drive system, for example, of FIG. 1. FIG. 8(a) shows a rotor position where the center line of a rotor pole is radially aligned with the center line of a stator pole, i.e. a position in which the inductance of the phase winding around the stator pole would be a maximum. FIG. 8(b) shows the rotor position where the rotor has been rotated by half a rotor pole pitch so that the center line of the interpolar gap on the rotor is radially aligned with the center line of the stator pole, i.e. a position in which the inductance of the phase winding would be a minimum. In this particular embodiment of the invention, the stator pole face 104 retains the conventional profile of an arc centered on the axis of rotation of the rotor, while the profile of the rotor pole face is dimensioned according to principles of the invention, as described below.

Figure 8C:
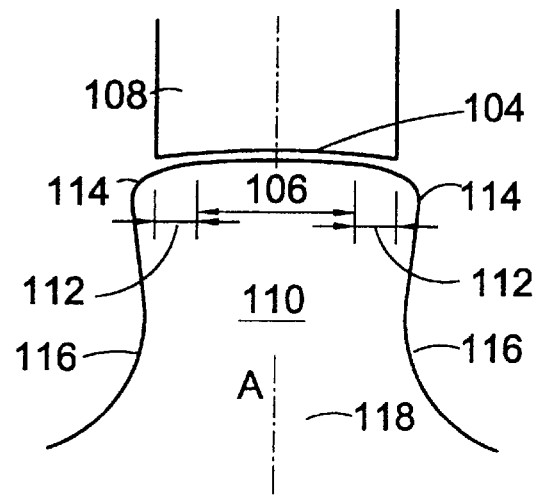

An enlarged view of part of FIG. 8(a) is shown in FIG. 8(c), where the particular profiling of the rotor pole in this example is clearly shown. The profile of the rotor pole has the following features:

1. The rotor pole is substantially symmetrical about a center line A extending from the axis of rotation of the rotor.

2. There is a convex first portion 106, centered around the center line A of the pole, over which the pole face is arcuate, with the center of the arc coincident with the center of the rotor lamination.

3. There are second portions 112 each angularly adjacent either side of the first portion, over which the rotor pole face is smoothly graded away from the stator pole face. The grading of this portion is such that there is no discontinuity with the first portion.

4. There are third portions 114 each angularly adjacent either side of the second portions, which are characterized by a radiussed form and which serve to extend the width of the pole. The size and centers of their radii are chosen such that there is no discontinuity with the second portions.

5. The pole sides have undercuts 116 extending from each third portion of the pole face toward the root 118 of each rotor pole 110 where they merge with the main pole body. The profile of the undercuts 116 is such that there is no discontinuity with the third portion or the pole body. The undercuts define a waist in the profile of the rotor or stator pole such that the chordal width of the pole at the waist is less than the chordal width across the third portions.

It is seen from FIG. 8(c) that the profile does not affect to any great extent the inductance of the phase winding in the aligned position, since the main air gap is virtually unaltered, the extra angular width of the rotor pole (due to the third portions) compensating for the slightly increased air gap length associated with the second portions. Nor is there any significant effect on the inductance in the position shown in FIG. 8(b), since much of the flux path remains at least as long as it would be in a conventional stator/rotor arrangement, the undercut pole sides compensating for the effect of the third portions. The waist region, defined by the undercuts 116, increases the flux path between the stator pole and the side of the rotor pole when the rotor is in or near a maximum reluctance position, i.e. when a stator pole is angularly equidistant adjacent rotor poles. The performance of the machine is greatly influenced by maximizing the difference in inductance between the minimum and maximum reluctance positions.

According to this embodiment of the invention the maximum angular extent of the rotor pole 110 is greater than that of the stator pole 108.

Figure 10A:
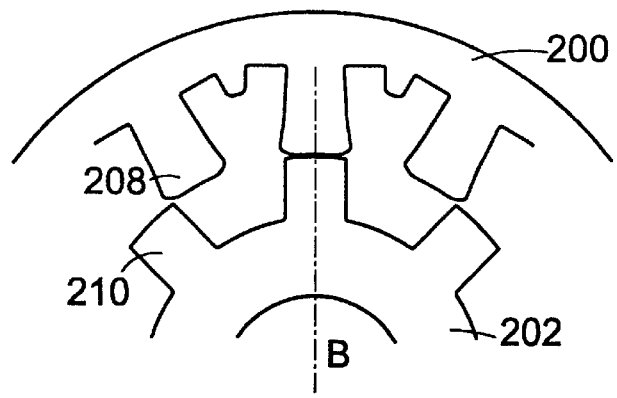
FIGS. 10(a)–10(c) show an exemplary lamination profile according to an embodiment of the invention.
Figure 10B:
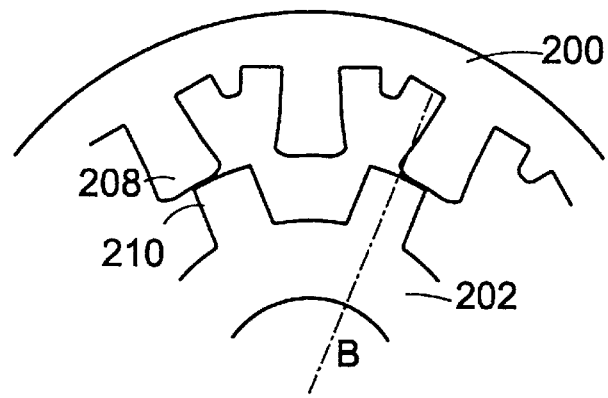

FIGS. 10(a) and 10(b) show sections of a stator lamination 200 and a rotor lamination 202 for a switched reluctance machine with 12 stator poles 208 and 8 rotor poles 210 using proportions according to embodiments of the invention. As in a conventional machine, the rotor and the stator are each made up of a stack of such laminations and incorporated in the drive system, for example, of FIG. 1. FIG. 10(a) shows a rotor position where the center line of a rotor pole is radially aligned with the center line of a stator pole, i.e. a position in which the inductance of the phase winding around the stator pole would be a maximum. FIG. 10(b)

shows the rotor position where the rotor has been rotated by half a rotor pole pitch so that the center line of the interpolar gap on the rotor is radially aligned with the center line of the stator pole, i.e. a position in which the inductance of the phase winding would be a minimum. In this particular embodiment of the invention, the rotor pole face 204 retains the conventional profile of an arc centered on the axis of rotation of the rotor, while the profile of the stator pole face is dimensioned according to principles of the invention, as described below.

Figure 10C:
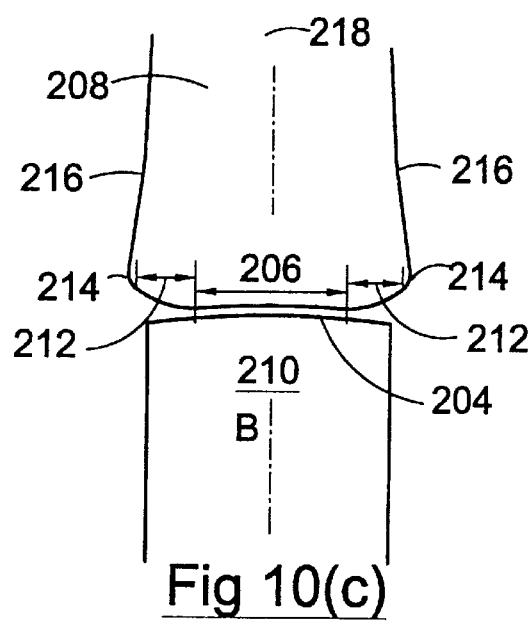

An enlarged view of part of FIG. 10(a) is shown in FIG. 10(c), where the particular profiling of the stator pole in this example is clearly shown.

The profile of the stator pole has the following features:

1. The stator pole is substantially symmetrical about a center line B extending from the axis of rotation of the rotor.

2. There is a first portion 206, centered around the center line B of the pole, over which the pole face is arcuate, with the center of the arc coincident with the center of the rotor lamination. Because this is the stator, the first portion 206 is concave.

3. There are second portions 212 each angularly adjacent either side of the first portion, over which the stator pole face is smoothly graded away from the rotor pole face. The grading of this portion is such that there is no discontinuity with the first portion.

4. There are third portions 214 each angularly adjacent either side of the second portions, which are characterized by a radiussed form and which serve to extend the width of the pole. The size and centers of their radii are chosen such that there is no discontinuity with the second portions.

5. The pole sides have undercuts 216 extending from each third portion 214 of the pole toward the root 218 of each stator pole 208 where they merge with the main pole body. The profile of the undercuts 216 is such that there is no discontinuity with the third portion or the pole body. The undercuts define a waist in the profile of the stator pole such that the chordal width of the pole at the waist is less than the chordal width across the third portions.

It is seen from FIG. 10(c) that the profile does not affect to any great extent the inductance of the phase winding in the aligned position, since the main air gap is virtually unaltered, the extra angular width of the stator pole (due to the third portions) compensating for the slightly increased air gap length associated with the second portions.

It will be noted from FIG. 10(b) that, because of the third portions, the stator pole is effectively closer to the rotor poles on either side than is the case with a conventional rotor/stator pole pair. This will have a detrimental effect on the minimum inductance. Thus, the benefit gained will be reduced in comparison with the previous embodiment in which it is the rotor poles that are profiled.

According to this embodiment of the invention the maximum angular extent of the stator pole 208 is greater than that of the rotor pole 210.

In any of the cases where the rotor pole alone is profiled, the stator pole alone is profiled, or both are profiled, a characteristic air gap is formed between the two poles when they are aligned on a common radius. The air gap has:

1. A first angular extent, centered about the center lines of the poles, where the air gap is constant.

2. Second angular extents, adjacent each end of the first extent, over which the air gap is continuously increasing with increased angular distance from the center lines of the poles.

3. The rate of change of air gap length has no discontinuities.

4. The angular width of the first extent should not be greater than 80% of the angular width of the rotor pole.

The invention is intended to provide a relatively smooth transition as the leading rotor pole side begins to overlap the stator pole. Thereafter, the air gap approaches uniformity across an inner region centered on a mid point of each of the poles. Subsequently, the average air gap proceeds to increase again as the rotor pole departs from alignment with the stator poles but similarly gradually so that the rate of change of force with rotor angle is reduced.

The air gap defined by the rotor pole profile has the advantage, as the rotor rotates, of avoiding abrupt transitions in effective air gap which are present in a conventional rotor/stator arrangement when approaching the position at which the pole faces begin to overlap. Thus, the steep gradient of force exerted between the rotor and the stator, associated with conventionally abrupt corners, is significantly reduced. As a result, the vibration associated with these high rates of change of force is also reduced.

The profile of the rotor pole face can be varied according to a specific application. A family of profiles is derivable having either varying radii of the extension portions, varying proportions of extension portion, varying rates of increase and final air gap values or a selection from some or all of these parameters. In all, the benefit achieved is to reduce the rates of change of force exerted. This leads to reduced vibration and acoustic noise for a given output of machine.

Figure 9:
FIG. 9 shows the vibration spectra of machines using conventional lamination profiles and the lamination profiles of FIG. 8.

FIG. 9 illustrates a spectral analysis of vibration in switched reluctance machines with conventional profile of rotor and stator pole arcs ('standard') and with rotor pole arcs profiled according to the invention ('profile'). The switched reluctance machine in question was a 7.5 kW machine with 12 stator poles and 8 rotor poles, a shaft height of 132 mm and a rated speed of 1500 rev/min. It will be apparent that the profiled pole face according to this embodiment of the invention achieves lower magnitudes of vibration at all of the center band frequencies studied, and that the reduction is particularly effective at 4458 Hz, where the vibration forces are at their greatest.

Because it is the mutual interaction of the edges of the rotor and stator poles that is addressed by the invention, it will be apparent to the skilled person that the pole profile discussed above could equally well be applied to the stator pole profile mutatis mutandis. By logical extension, the desired effect could be achieved by suitably adapting both pole profiles. Additionally, the extension portions 114 could be used to additional benefit in retaining stator windings around the poles of the stator laminations or retaining streamlining components between rotor poles.

Similarly, embodiments of the invention could be applied to a linear motor in which the attraction of a moving member by a stator will give rise to forces substantially normal to the direction of travel. As for the ovalizing forces described above for rotating machines, the normal force will tend to distort the machine by bending and could give rise to vibration and acoustic noise as a result. Thus, the pole shape of the stator and/or the moving member could be modified according to embodiments of the invention to equal effect. Thus, the skilled person will appreciate that variation of the disclosed arrangements are possible without departing from the invention. Accordingly, the above description of several embodiments is made by way of example and not for the purposes of limitation. The present invention is intended to be limited only by the spirit and scope of the following claims.

What is claimed is:

1. A set of laminations for a reluctance machine, comprising: a rotor lamination and a stator lamination, each respective lamination having a body and an array of poles extending radially from its respective body about an axis, each pole being substantially symmetrical about a center line and having a pole face and side surfaces extending between the body and the pole face, the pole faces of the rotor poles and the pole faces of the stator poles cooperating to define respective air gaps therebetween when the laminations are arranged on a common axis and the center lines of the rotor poles and the center lines of the stator poles are coincident, each air gap having an inner region of substantially constant radial length and an outer region, on either side of the inner region, of progressively greater radial length extending away from the inner region, one or both of the said rotor poles and stator poles having an extension on the side of each outer region, the extension smoothly merging each outer region with a corresponding side surface, and at least one of the laminations having an undercut defining a waist in said one or both poles between each extension and the body, the pole faces having dimensions adapted to provide a smoothly changing flux path as the rotor pole moves into and out of alignment with the stator pole, thereby tending to reduce vibration and acoustic noise for a given output of the reluctance machine, wherein the inner region extends angularly up to four times an angular width of one of the outer regions.

2. A set as claimed in claim 1 in which both the inner region and the outer regions have an angular extent, further in which each rotor pole face has an arcuate surface over the angular extent of both the inner region and the outer regions, the arc of the arcuate surface coinciding with a diameter centered on the said common axis.

3. A set as claimed in claim 2 in which the extensions are on the stator pole and lie angularly beyond the said arcuate surface of the rotor pole face.

4. A set as claimed in claim 3 in which the waist of the stator pole has a chordal width less than a greatest chordal width between the extensions.

5. A set as claimed in claim 1 in which both the inner region and the outer regions have an angular extent, further in which the stator pole face has an arcuate surface over the angular extent of both the inner region and the outer regions, the arc of the arcuate surface coinciding with a diameter centered on the said common axis.

6. A set as claimed in claim 5 in which the extensions are on the rotor pole and lie angularly beyond the said arcuate surface of the stator pole face.

7. A set as claimed in claim 6 in which the chordal width of the waist of the rotor pole is less than a greatest chordal width between the extension regions.

8. A set as claimed in claim 1 in which the rotor poles and stator poles are shaped such that the air gap in each outer region increases radially to about twice a radial length of the air gap in the inner region.

9. A reluctance machine comprising a stator and a rotor made up of a stack of the set of laminations as claimed in claim 1.

10. A machine as claimed in claim 9, in which the rotor is mounted to rotate within the stator.

11. A set of laminations for a reluctance machine, comprising: a rotor lamination and a stator lamination, each respective lamination having a body and an array of poles extending radially from its respective body about an axis, each pole being substantially symmetrical about a center line and having a pole face and side surfaces extending between the body and the pole face, the pole faces of the rotor poles and the pole faces of the stator poles cooperating to define respective air gaps therebetween when the laminations are arranged on a common axis and the center lines of the rotor poles and the center lines of the stator poles are coincident, each air gap having an inner region of substantially constant radial length and an outer region, on either side of the inner region, of progressively greater radial length extending away from the inner region, one or both of the said rotor poles and stator poles having an extension on the side of each outer region, the extension smoothly merging each outer region with a corresponding side surface, and at least one of the laminations having an undercut defining a waist in said one or both poles between each extension and the body, the pole faces having dimensions adapted to provide a smoothly changing flux pa th as the rotor pole moves into and out of alignment with the stator pole, wherein the inner region extends angularly up to four times the angular width of one of the outer regions.

12. A set as claimed in claim 11 in which both the inner region and the outer regions have an angular extent, further in which each rotor pole face has an arcuate surface over the angular extent of both the inner region and the outer regions, the arc of the arcuate surface coinciding with a diameter centered on the said common axis.

13. A set as claimed in claim 12 in which the extensions are on the stator pole and lie angularly beyond the said arcuate surface of the rotor pole face.

14. A set as claimed in claim 13 in which the waist of the stator pole has a chordal width less than a greatest chordal width between the extensions.

15. A set as claimed in claim 11 in which both the inner region and the outer regions have an angular extent, further in which the stator pole face has an arcuate surface over the angular extent of both the inner region and the outer regions, the arc of the arcuate surface coinciding with a diameter centered on the said common axis.

16. A set as claimed in claim 15 in which the extensions are on the rotor pole and lie angularly beyond the said arcuate surface of the stator pole face.

17. A set as claimed in claim 16 in which the chordal width of the waist of the rotor pole is less than a greatest chordal width between the extension regions.

18. A set as claimed in claim 11 in which the rotor poles and stator poles are shaped such that the air gap in each outer region increases radially to about twice a radial length of the air gap in the inner region.

19. A reluctance machine comprising a stator and a rotor made up of a stack of the set of laminations as claimed in claim 11.

20. A machine as claimed in claim 19, in which the rotor is mounted to rotate within the stator.

21. A set of laminations for a reluctance machine, comprising: a rotor lamination and a stator lamination, each respective lamination having a body and an array of poles extending radially from its respective body about an axis, each pole being substantially symmetrical about a center line and having a pole face and side surfaces extending between the body and the pole face, the pole faces of the rotor poles and the pole faces of the stator poles cooperating to define respective air gaps therebetween when the laminations are arranged on a common axis and the center lines of the rotor poles and the center lines of the stator poles are coincident, each air gap having an inner region of substantially constant radial length and an outer region, on either side of the inner region, of progressively greater radial length extending away from the inner region, one or both of the said rotor poles and stator poles having an extension on the side of each outer region, the extension smoothly merging each outer region with a corresponding side surface, and at least one of the laminations having an undercut defining a waist in said one or both poles between each extension and the body, the pole faces having dimensions adapted to provide a smoothly changing flux path as the rotor pole moves into and out of alignment with the stator pole, wherein the rotor poles and stator poles are shaped such that the air gap in each outer region increases radially to about twice the radial length of the air gap in the inner region.

22. A set as claimed in claim 21 in which both the inner region and the outer regions have an angular extent, further in which each rotor pole face has an arcuate surface over the angular extent of both the inner region and the outer regions, the arc of the arcuate surface coinciding with a diameter centered on the said common axis.

23. A set as claimed in claim 22 in which the extensions are on the stator pole and lie angularly beyond the said arcuate surface of the rotor pole face.

24. A set as claimed in claim 23 in which the waist of the stator pole has a chordal width less than a greatest chordal width between the extensions.

25. A set as claimed in claim 21 in which both the inner region and the outer regions have an angular extent, further in which the stator pole face has an arcuate surface over the angular extent of both the inner region and the outer regions, the arc of the arcuate surface coinciding with a diameter centered on the said common axis.

26. A set as claimed in claim 25 in which the extensions are on the rotor pole and lie angularly beyond the said arcuate surface of the stator pole face.

27. A set as claimed in claim 26 in which the chordal width of the waist of the rotor pole is less than a greatest chordal width between the extension regions.

28. A set as claimed in claim 21 in which the inner region extends angularly up to four times an angular width of one of the outer regions.

29. A reluctance machine comprising a stator and a rotor made up of a stack of the set of laminations as claimed in claim 21.

30. A machine as claimed in claim 29, in which the rotor is mounted to rotate within the stator.

31. A set of laminations for a reluctance machine, comprising: a rotor lamination and a stator lamination, each respective lamination having a body and an array of poles extending radially from its respective body about an axis, each pole being substantially symmetrical about a center line and having a pole face and side surfaces extending between the body and the pole face, the pole faces of the rotor poles and the pole faces of the stator poles cooperating to define respective air gaps therebetween when the laminations are arranged on a common axis and the center lines of the rotor poles and the center lines of the stator poles are coincident, each air gap having an inner region of substantially constant radial length and an outer region, on either side of the inner region, of progressively greater radial length extending away from the inner region, one or both of the said rotor poles and stator poles having an extension on the side of each outer region, the extension smoothly merging each outer region with a corresponding side surface, and at least one of the laminations having an undercut defining a waist in said one or both poles between each extension and the body, the pole faces having dimensions adapted to provide a smoothly changing flux path as the rotor pole moves into and out of alignment with the stator pole, thereby tending to reduce vibration and acoustic noise for a given output of the reluctance machine, wherein the rotor poles and stator poles are shaped such that the air gap in each outer region increases radially to about twice a radial length of the air gap in the inner region.

32. A set as claimed in claim 31 in which both the inner region and the outer regions have an angular extent, further in which each rotor pole face has an arcuate surface over the angular extent of both the inner region and the outer regions, the arc of the arcuate surface coinciding with a diameter centered on the said common axis.

33. A set as claimed in claim 32 in which the extensions are on the stator pole and lie angularly beyond the said arcuate surface of the rotor pole face.

34. A set as claimed in claim 33 in which the waist of the stator pole has a chordal width less than a greatest chordal width between the extensions.

35. A set as claimed in claim 31 in which both the inner region and the outer regions have an angular extent, further in which the stator pole face has an arcuate surface over the angular extent of both the inner region and the outer regions, the arc of the arcuate surface coinciding with a diameter centered on the said common axis.

36. A set as claimed in claim 35 in which the extensions are on the rotor pole and lie angularly beyond the said arcuate surface of the stator pole face.

37. A set as claimed in claim 36 in which the chordal width of the waist of the rotor pole is less than a greatest chordal width between the extension regions.

38. A set as claimed in claim 31 in which the inner region extends angularly up to four times an angular width of one of the outer regions.

39. A reluctance machine comprising a stator and a rotor made up of a stack of the set of laminations as claimed in claim 31.

40. A machine as claimed in claim 39, in which the rotor is mounted to rotate within the stator.

* * * * *